US007230068B2

(12) United States Patent
Wilson

(10) Patent No.: US 7,230,068 B2
(45) Date of Patent: Jun. 12, 2007

(54) POLYMER DERIVATIVES

(75) Inventor: Troy E. Wilson, San Marino, CA (US)

(73) Assignee: Ambrx, Inc., La Jolla, CA (US)

( * ) Notice: Subject to any disclaimer, the term of this patent is extended or adjusted under 35 U.S.C. 154(b) by 0 days.

(21) Appl. No.: 10/960,674

(22) Filed: Oct. 7, 2004

(65) Prior Publication Data

US 2005/0085619 A1    Apr. 21, 2005

Related U.S. Application Data

(60) Provisional application No. 60/510,169, filed on Oct. 9, 2003.

(51) Int. Cl.
 C08G 65/08 (2006.01)
 C08G 65/331 (2006.01)
 C08G 65/332 (2006.01)
 C08G 65/334 (2006.01)
 C08G 65/337 (2006.01)
(52) U.S. Cl. .................. 528/407; 525/58; 525/403; 525/404; 525/405; 525/407; 525/408
(58) Field of Classification Search ............ 514/772.4, 514/772.7; 525/54, 11, 61, 404, 408, 409; 528/421
See application file for complete search history.

(56) References Cited

U.S. PATENT DOCUMENTS

| | | | | |
|---|---|---|---|---|
| 4,289,872 A | 9/1981 | Denkewalter et al. | ...... | 528/328 |
| 4,670,417 A | 6/1987 | Iwasaki et al. | ................ | 514/6 |
| 5,191,034 A | 3/1993 | Ahad | | |
| 5,229,490 A | 7/1993 | Tam | .......................... | 530/324 |
| 5,252,714 A | 10/1993 | Harris et al. | ............. | 530/391.9 |
| 5,281,698 A | 1/1994 | Nitecki | ....................... | 530/351 |
| 5,468,478 A | 11/1995 | Saifer et al. | ............. | 424/78.27 |
| 5,643,575 A | 7/1997 | Martinez et al. | ......... | 424/194.1 |
| 5,650,234 A | 7/1997 | Dolence et al. | ............. | 428/447 |
| 5,672,662 A | 9/1997 | Harris et al. | ................. | 525/408 |
| 5,824,784 A | 10/1998 | Kinstler et al. | ............. | 530/399 |
| 5,900,461 A | 5/1999 | Harris | ..................... | 525/54.11 |
| 5,932,462 A | 8/1999 | Harris et al. | ................. | 435/188 |
| 6,448,369 B1 * | 9/2002 | Bentley et al. | ............. | 528/425 |
| 6,602,498 B2 | 8/2003 | Shen | ....................... | 424/78.08 |
| 6,610,281 B2 | 8/2003 | Harris | ..................... | 424/78.08 |
| 2003/0096918 A1 * | 5/2003 | Meldal et al. | ............... | 525/419 |
| 2003/0143596 A1 | 7/2003 | Bentley et al. | ................ | 435/6 |

FOREIGN PATENT DOCUMENTS

| | | | |
|---|---|---|---|
| EP | 0239 770 | | 10/1987 |
| FR | 2753975 A1 * | | 4/1998 |
| JP | 55-092000 | | 7/1980 |
| JP | 56067309 A * | | 6/1981 |
| WO | WO 93/21259 A1 | | 10/1993 |
| WO | WO 96/21469 A1 | | 7/1996 |

OTHER PUBLICATIONS

Garanti et al., "MeOPEG-bounded azide cycloadditions to alkenyl dipolarophiles," Tetrahedron Letters, vol. 44, Dec. 2002, pp. 1133-1135.*
Wilson et al., "Synthesis of Novel Energetic Compounds. 4," Journal of Chemical Engineering Data, vol. 27, May 1982, pp. 472 and 473.*
Iyer et al., "Synthesis of orthogonal and functionalized oligoethylene glycols of defined lengths," Tetrahedron Letters, vol. 45, Apr. 2004, pp. 4285-4288.*
CAPLUS accession No. 1986:406904, Zalipsky et al., "Preparation of polyethylene glycol derivatives with two different functional groups at the terminii," Polymer Preprints, vol. 27, No. 1, abstract.*
Abuchowski, A. et al. "Cancer Therapy With Chemically Modified Enzymes. I. Antitumor Properties of Polyethylene Glycol-Asparaginase Conjugates," Cancer Biochem Biophys. Jun. 1984; 7 (2) :175-86.
Andresz, H. et al. "Chemische Synthese Verzweigter Polysaccharide, 5; Kopplung Von Oligosacchariden Und Amylose An Verschiedene Träger Durch Hydrazonbindung," Makromol. Chem. 1978;179:301-12.
Beauchamp, Co et al. "A New Procedure for the Synthesis of Polyethylene Glycol-Protein Adducts; Effects on Function, Receptor Recognition, and Clearance of Superoxide Dismutase, Lactoferrin, and Alpha 2-Macroglobulin," Anal Biochem. May 1983; 131 (1) :25-33.
Bückmann, AF et al. "Functionalization of Poly(Ethylene Glycol) and Monomethoxy-Poly(Ethylene Glycol)," Makromol. Chem. 1981; 182:1379-84.
Chin, JW et al. "An Expanded Eukaryotic Genetic Code," Science. Aug. 15, 2003;301(5635) :964-7.
Chin, JW et al. "Addition of P-Azido-L-Phenylalanine to the Genetic Code of *Escherichia coli* ," J Am Chem Soc. Aug. 7, 2002;124 (31) :9026-7.
Chin, JW & P. G. Schultz. "In Vivo Photocrosslinking with Unnatural Amino Acid Mutagenesis," Chembiochem. Nov. 4, 2002;3 (11) :1135-7.
Chin, JW et al. "Addition of a Photocrosslinking Amino Acid to the Genetic Code of *Escherichia coli*," Proc Natl Acad Sci USA Aug. 20, 2002;99(17) :11020-4. EPUB Aug. 1, 2002.
Clark, R et al. "Long-Acting Growth Hormones Produced by Conjugation with Polyethylene Glycol," J Biol Chem. Sep. 6, 1996;271 (36) :21969-77.
Elling, L et MR Kula. "Immunoaffinity Partitioning: Synthesis and Use of Polyethylene Glycol-Oxirane for Coupling to Bovine Serum Albumin and Monoclonal Antibodies," Biotechnol Appl Biochem. Jun. 1991;13 (3) :354-62.

(Continued)

Primary Examiner—Robert Sellers
(74) *Attorney, Agent, or Firm*—John W. Wallen, III; Jeanette Quan

(57) ABSTRACT

The invention provides water-soluble compounds that include a polymer and at least one terminal azide or acetylene moiety. Also provided are highly efficient methods for the selective modification of proteins with PEG derivatives, which involves the selective incorporation of non-genetically encoded amino acids, e.g., those amino acids containing an azide or acetylene moiety, into proteins in response to a selector codon and the subsequent modification of those amino acids with a suitably reactive PEG derivative.

51 Claims, No Drawings

OTHER PUBLICATIONS

Goodson RJ et NV Katre. "Site-Directed Pegylation of Recombinant Interleukin-2 at its Glycosylation Site," Biotechnology (N Y). Apr. 1990;8(4) :343-6.

Harris, JM et al. "Synthesis and Characterization of Poly(Ethylene Glycol) Derivatives," J. Polym. Sci. Chem. Ed. 1984; 22:341-352.

Huisgen, R. "1, 3-Dipolar Cycloadditions -Introduction, Survey, Mechanism," In *1,3-Dipolar Cycloaddition Chemistry,* (1984) Ed. Padwa, A., Wiley, New York, p. 1-176.

Joppich, M et PL Luisi. "Peptides Flanked by Two Polymer Chains, 1; Synthesis of Glycyl-L-Tryptophylglycine Substituted by Poly(Ethylene Oxide) at Both the Carboxy and the Amino End Groups," Makromol. Chem. 1979;180:1381-4.

Kogan, TP. "The Synthesis of Substituted Methoxy-Poly(Ethyleneglycol) Derivatives Suitable for Selective Protein Modification," Synthetic Comm. 1992; 22(16) :2417-24.

Olson, K et al. "Preparation and Characterization of Poly(Ethylene Glycol)ylated Human Growth Hormone Anatagonist," In *Poly(Ethylene Glycol) Chemistry & Biological Applications*, (1997) Harris, JM & Zapliipsky, S Eds., ACS, Washington, D.C., p. 170-181.

Padwa, A. "Intermolecular 1,3-Dipolar Cycloadditions," In *Comprehensive Organic Synthesis,* vol. 4, (1991) Ed. Trost, BM, Pergamon Press, Oxford, p. 1069-1109.

Pitha J et al. "Detergents Linked to Polysaccharides: Preparation and Effects on Membranes and Cells," Eur J Biochem. Feb. 15, 1979;94(1) :11-8.

Romani, S et al. "Synthesis of Unsymmetrical Cystine Peptides: Directed Disulfide Pairing with the Sulfenohydrazide Method," In *Chemistry of Peptides and Proteins,* vol. 2 (1984) Volter, W et al., Eds., Walter De Gruyter, Berlin, p. 29-34.

Rostovtsev, VV et al. "A Stepwise Huisgen Cycloaddition Process: Copper(I)-Catalyzed Regioselective "Ligation" of Azides and Terminal Alkynes," Angew Chem Int Ed Engl. Jul. 15, 2002;41 (14) :2596-9.

Sartore, L et al. "Enzyme Modification by MPEG with an Amino Acid or Peptide as Spacer Arms," Appl Biochem Biotechnol. Jan. 1991;27(1) :45-54.

Sawhney, AS et al., "Bioerodible Hydrogels Based on Photopolymerized Poly(Ethylene Glycol) -Co-Poly(Alpha-Hydroxy Acid) Diacrylate Macromers," Macromolecules 1993; 26:581-7.

Tondelli, L et al. "Poly(Ethylene Glycol) Imidazolyl Formates as Oligometric Drug-Binding Matrices," J. Controlled Release 1985;1:251-7.

Tornoe, CW et al. "Peptidotriazoles on Solid Phase: [1,2,3]—Triazoles By Regiospecific Copper(I) -Catalyzed 1,3-Dipolar Cycloadditions of Terminal Alkynes to Azides," J Org Chem. May 3, 2002;67(9) :3057-64.

Veronese, FM et al. "Surface Modification of Proteins. Activation of Monomethoxy-Polyethylene Glycols by Phenylchloroformates and Modification of Ribonuclease and Superoxide Dismutase," Appl Biochem Biotechnol. Apr. 1985;11 (2) :141-52.

Wang, L et al. "Expanding the Genetic Code of *Escherichia coli,*" Science. Apr. 20, 2001;292 (5516) :498-500.

Wang, L & PG Schultz. "Expanding the Genetic Code," Chem Commun (CAMB) . Jan. 7, 2002; (1) :1-11.

Woghiren, C et al. "Protected Thiol-Polyethylene Glycol: A New Activated Polymer for Reversible Protein Modification," Bioconjug Chem. Sep.-Oct. 1993;4 (5) :314-8.

Zalipsky, S et al. "Attachment of Drugs to Polyethylene Glycols," Eur. Polym. J. 1983 19(12) :1177-83.

Zalipsky, S. et G. Barany. "Preparation of Polyethylene Glycol Derivatives with Two Different Functional Groups at the Termini," Polymer Preprints (1986) , 27 (1) , 1-2.

* cited by examiner

POLYMER DERIVATIVES

CROSS-REFERENCE TO RELATED APPLICATIONS

This application claims the benefit of priority to U.S. Provisional Application No. 60/510,169 filed Oct. 9, 2003 entitled POLYMER DERIVATIVES which is incorporated by reference herein in its entirety.

BACKGROUND OF THE INVENTION

1. Field of the Invention

This invention relates to derivatives of hydrophilic compounds and polymers that contain azide or alkyne moieties, methods for their synthesis, and methods for their use in modifying the characteristics and properties of molecules.

2. Background

Covalent attachment of the hydrophilic polymer poly(ethylene glycol), abbreviated PEG, is a method of increasing water solubility and bioavailability and extending the circulation time of many biologically active molecules, including proteins, peptides, and particularly hydrophobic molecules. PEG has been used extensively in pharmaceuticals, on artificial implants, and in other applications where biocompatibility, lack of toxicity, and lack of immunogenicity are of importance. In order to maximize the desired properties of PEG, the total molecular weight and hydration state of the PEG polymer or polymers attached to the biologically active molecule must be sufficiently high to impart the advantageous characteristics typically associated with PEG polymer attachment, such as increased water solubility and circulating half life, while not adversely impacting the bioactivity of the parent molecule.

PEG derivatives are frequently linked to biologically active molecules through reactive chemical functionalities, such as lysine, cysteine and histidine residues, the N-terminus and carbohydrate moieties. Proteins and other molecules often have a limited number of reactive sites available for polymer attachment. Often, the sites most suitable for modification via polymer attachment play a significant role in receptor binding, and are necessary for retention of the biological activity of the molecule. As a result, indiscriminate attachment of polymer chains to such reactive sites on a biologically active molecule often leads to a significant reduction or even total loss of biological activity of the polymer-modified molecule. R. Clark et al., (1996), *J. Biol. Chem.*, 271:21969–21977. To form conjugates having sufficient polymer molecular weight for imparting the desired advantages to a target molecule, prior art approaches have typically involved random attachment of numerous polymer arms to the molecule, thereby increasing the risk of a reduction or even total loss in bioactivity of the parent molecule.

Reactive sites that form the loci for attachment of PEG derivatives to proteins are dictated by the protein's structure. Proteins, including enzymes, are built of various sequences of alpha-amino acids, which have the general structure $H_2N$—$CHR$—$COOH$. The alpha amino moiety ($H_2N$—) of one amino acid joins to the carboxyl moiety (—$COOH$) of an adjacent amino acid to form amide linkages, which can be represented as —($NH$—$CHR$—$CO$)$_n$—, where the subscript "n" can equal hundreds or thousands. The fragment represented by R can contain reactive sites for protein biological activity and for attachment of PEG derivatives.

For example, in the case of the amino acid lysine, there exists an —$NH_2$ moiety in the epsilon position as well as in the alpha position. The epsilon —$NH_2$ is free for reaction under conditions of basic pH. Much of the art in the field of protein derivatization with PEG has been directed to developing PEG derivatives for attachment to the epsilon —$NH_2$ moiety of lysine residues present in proteins. "Polyethylene Glycol and Derivatives for Advanced PEGylation", Nektar Molecular Engineering Catalog, 2003, pp. 1–17. These PEG derivatives all have the common limitation, however, that they cannot be installed selectively among the often numerous lysine residues present on the surfaces of proteins. This can be a significant limitation in instances where a lysine residue is important to protein activity, existing in an enzyme active site for example, or in cases where a lysine residue plays a role in mediating the interaction of the protein with other biological molecules, as in the case of receptor binding sites.

A second and equally important complication of existing methods for protein PEGylation is that the PEG derivatives can undergo undesired side reactions with residues other than those desired. Histidine contains a reactive imino moiety, represented structurally as —$N(H)$—, but many derivatives that react with epsilon —$NH_2$ can also react with —$N(H)$—. Similarly, the side chain of the amino acid cysteine bears a free sulfhydryl group, represented structurally as —$SH$. In some instances, the PEG derivatives directed at the epsilon —$NH_2$ group of lysine also react with cysteine, histidine or other residues. This can create complex mixtures of PEG-derivatized bioactive molecules and risks destroying the activity of the bioactive molecule being targeted. It would be desirable to develop PEG derivatives that permit a chemical functional group to be introduced at a single site within the protein that would then enable the selective coupling of one or more PEG polymers to the bioactive molecule at specific sites on the protein surface that are both well-defined and predictable.

In addition to lysine residues, considerable effort in the art has been directed toward the development of activated PEG reagents that target other amino acid side chains, including cysteine, histidine and the N-terminus. U.S. Pat. No. 6,610,281. "Polyethylene Glycol and Derivatives for Advanced PEGylation", Nektar Molecular Engineering Catalog, 2003, pp. 1–17. Cysteine residue can be introduced site-selectively into the structure of proteins using site-directed mutagenesis and other techniques known in the art, and the resulting free sulfhydryl moiety can be reacted with PEG derivatives that bear thiol-reactive functional groups. This approach is complicated, however, in that the introduction of a free sulfhydryl group can complicate the expression, folding and stability of the resulting protein. Thus, it would be desirable to have a means to introduce a chemical functional group into bioactive molecules that enables the selective coupling of one or more PEG polymers to the protein while simultaneously being compatible with (i.e., not engaging in undesired side reactions with) sulfhydryls and other chemical functional groups typically found in proteins.

As can be seen from a sampling of the art, many of these derivatives that have been developed for attachment to the side chains of proteins, in particular, the —$NH_2$ moiety on the lysine amino acid side chain and the —$SH$ moiety on the cysteine side chain, have proven problematic in their synthesis and use. Some form unstable linkages with the protein that are subject to hydrolysis and therefore do not last very long in aqueous environments, such as in the blood stream. Some form more stable linkages, but are subject to hydrolysis before the linkage is formed, which means that the reactive group on the PEG derivative may be inactivated before the protein can be attached. Some are somewhat toxic and are therefore less suitable for use in vivo. Some are too slow to react to be practically useful. Some result in a loss of protein activity by attaching to sites responsible for the protein's activity. Some are not specific in the sites to which they will attach, which can also result in a loss of desirable activity and in a lack of reproducibility of results. In order to overcome the challenges associated with modifying proteins with poly(ethylene glycol) moieties, PEG derivatives have been developed that are more stable (e.g., U.S. Pat. No. 6,602,498) or that react selectively with thiol moieties on molecules and surfaces (e.g., U.S. Pat. No. 6,610,281). There is clearly a need in the art for PEG derivatives that are chemically inert in physiological environments until called upon to react selectively to form stable chemical bonds.

Recently, an entirely new technology in the protein sciences has been reported, which promises to overcome many of the limitations associated with site-specific modifications of proteins. Specifically, new components have been added to the protein biosynthetic machinery of the prokaryote *Escherichia coli* (*E. coli*) (e.g., L. Wang, et al., (2001), *Science* 292:498–500) and the eukaryote *Sacchromyces cerevisiae* (*S. cerevisiae*) (e.g., J. Chin et al., *Science* 301:964–7 (2003)), which has enabled the incorporation of non-genetically encoded amino acids to proteins in vivo. A number of new amino acids with novel chemical, physical or biological properties, including photoaffinity labels and photoisomerizable amino acids, keto amino acids, and glycosylated amino acids have been incorporated efficiently and with high fidelity into proteins in *E. coli* and in yeast in response to the amber codon, TAG, using this methodology. See, e.g., J. W. Chin et al., (2002), *Journal of the American Chemical Society* 124:9026–9027; J. W. Chin, & P. G. Schultz, (2002), *Chem Bio Chem* 11:1135–1137; J. W. Chin, et al., (2002), *PNAS United States of America* 99:11020–11024: and, L. Wang, & P. G. Schultz, (2002), *Chem. Comm.*, 1–10. These studies have demonstrated that it is possible to selectively and routinely introduce chemical functional groups, such as alkyne groups and azide moieties, that are not found in proteins, that are chemically inert to all of the functional groups found in the 20 common, genetically-encoded amino acids and that react efficiently and selectively to form stable covalent linkages.

The ability to incorporate non-genetically encoded amino acids into proteins permits the introduction of chemical functional groups that could provide valuable alternatives to the naturally-occurring functional groups, such as the epsilon —$NH_2$ of lysine, the sulfhydryl —SH of cysteine, the imino group of histidine, etc. Certain chemical functional groups are known to be inert to the functional groups found in the 20 common, genetically-encoded amino acids but react cleanly and efficiently to form stable linkages. Azide and acetylene groups, for example, are known in the art to undergo a Huisgen [3+2] cycloaddition reaction in aqueous conditions in the presence of a catalytic amount of copper. See, e.g., Tornoe, et al., (2002) *Org. Chem.* 67:3057–3064; and, Rostovtsev, et al., (2002) *Angew. Chem. Int. Ed.* 41:2596–2599. By introducing an azide moiety into a protein structure, for example, one is able to incorporate a functional group that is chemically inert to amines, sulfhydryls, carboxylic acids, hydroxyl groups found in proteins, but that also reacts smoothly and efficiently with an acetylene moiety to form a cycloaddition product. Importantly, in the absence of the acetylene moiety, the azide remains chemically inert and unreactive in the presence of other protein side chains and under physiological conditions.

While the art has disclosed compositions and methods for the introduction of non-genetically encoded amino acids into protein structures, there has been no effort to develop PEG derivatives that are capable of reacting efficiently and specifically with the new chemical functionalities. Accordingly, there is a need in the art for new PEG derivatives that provide the benefits associated with PEG polymers (i.e., increased solubility, stability and half-life and diminished immunogenicity) but that provide greater selectively and versatility for use in the modification of proteins with poly(ethylene glycol) derivatives. The present invention fulfils this and other needs.

SUMMARY OF THE INVENTION

The invention provides, in some embodiments, a water-soluble compound that includes a polymer and at least one terminal azide moiety. The compound or polymer may be selected from a wide range of suitable water soluble compounds or polymers. In one embodiment the compounds or polymers include but are not limited to nucleic acid molecules, polypeptides, charged compounds or polymers, and linear, branched or multi-armed compounds or polymers. In another embodiment the polymer includes but is not limited to poly(alkylene oxides), poly(oxyethylated polyols), and poly(olefinic alcohols). In some embodiments, the polymer includes but is not limited to poly(ethylene glycol), poly (propylene glycol), poly(oxyethylated glycerol), poly(oxyethylated sorbitol), poly(oxyethylated glucose), and poly (vinyl alcohol). The water-soluble compounds of the invention can be, for example, a polymer such as poly (ethylene glycol)azide in which the azide moiety is covalently attached directly to a polymer backbone. Alternatively, the azide moiety can be covalently attached to the polymer backbone by a linker. In some embodiments, the polymer is a straight chain polymer and the compound is not substituted with reactive functional groups beyond the azide moiety. In other embodiments, the polymer is a random or block copolymer or terpolymer.

In some embodiments, the invention provides water-soluble compounds that have a dumbbell structure that includes: a) an azide moiety on at least a first end of a polymer backbone; and b) at least a second functional group on a second end of the polymer backbone. The second functional group can be another azide moiety, or a different reactive group. The second functional group, in some embodiments, is not reactive with azide moieties. The invention provides, in some embodiments, water-soluble compounds that comprise at least one arm of a branched molecular structure. For example, the branched molecular structure can be dendritic.

In some embodiments, the azide moiety forms a linkage with another reactive moiety which may be on a surface or in a molecule. For example, the reactive moiety can be an acetylene moiety. The azide moiety can be linked to said polymer by a linkage that includes a linker moiety. In these embodiments, the polymer can include at least a second functional group other than the azide moiety for linking to said linker moiety. For example, the second functional group can be specific for nucleophilic displacement and the linker moiety can include a nucleophilic moiety capable of reacting with said functional group. In other embodiments, the second functional group is amine-specific and said linker moiety includes an active amine moiety. As another example, the second functional group can be specific for reaction at an electrophilic carbonyl and said linker moiety can include an electrophilic carbonyl moiety. For example, the second functional group can be specific for reaction with an activated ester and the linker moiety can include an activated ester. As another example, the second functional group can be specific for reaction with a ketone and said linker moiety includes a ketone. In another embodiment, the second functional group is specific for reaction with a thiol nucleophile and the linker moiety includes a thiol nucleophile. The second functional group is, in some embodiments, specific for reaction with a hydroxyl nucleophile and the linker moiety includes a hydroxyl nucleophile.

In some embodiments, the water-soluble compounds of the invention are stable in aqueous environments at a pH of about 11 or less.

Suitable linker moieties include, but are not limited to, —NH—CO—CH$_2$—CH$_2$—, —CO—NH—CH$_2$—CH$_2$—, —S—CH$_2$—CH$_2$—, and —O—CH$_2$—CH$_2$—.

The invention also provides water soluble activated polymers that are stable against hydrolysis, which activated polymers have the formula:

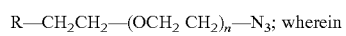

R—CH$_2$CH$_2$—(OCH$_2$ CH$_2$)$_n$—N$_3$; wherein n is from about 5 to 3,000, or from about 5 to 2,200, or from about 34 to 1,100, or from about 45 to 110, and R is a capping group, a functional group, or a leaving group that can be the same or different from the azide. R can be, for example, a functional group selected from the group consisting of hydroxyl, protected hydroxyl, alkoxyl, N-hydroxysuccinimidyl ester, 1-benzotriazolyl ester, N-hydroxysuccinimidyl carbonate, 1-benzotriazolyl carbonate, acetal, aldehyde, aldehyde hydrates, alkenyl, acrylate, methacrylate, acrylamide, active sulfone, amine, aminooxy, protected amine, hydrazide, protected hydrazide, protected thiol, carboxylic acid, protected carboxylic acid, isocyanate, isothiocyanate, maleimide, vinylsulfone, dithiopyridine, vinylpyridine, iodoacetamide, epoxide, glyoxals, diones, mesylates, tosylates, and tresylate, alkene, and ketone.

The invention also provides a water-soluble compound that includes a polymer and at least one acetylene moiety, wherein the polymer is selected from the group consisting of poly(alkylene oxides), poly(oxyethylated polyols), and poly(olefinic alcohols). The polymer, in some embodiments, is selected from the group consisting of poly(ethylene glycol), poly(propylene glycol), poly(oxyethylated glycerol), poly(oxyethylated sorbitol), poly(oxyethylated glucose), and poly(vinyl alcohol). For example, the compound can be a poly(ethylene glycol)acetylene, wherein the acetylene moiety is covalently bound to a polymer backbone via an ether linkage. In some embodiments, the compound is poly(ethylene glycol)acetylene and the acetylene moiety is covalently attached directly to a polymer backbone. Alternatively, the acetylene moiety can be covalently attached to the polymer backbone by a linker. In some embodiments, the polymer is a straight chain polymer and the compound is not substituted beyond the acetylene moiety. In other embodiments, the polymer is a random or block copolymer or terpolymer.

In some embodiments, the invention provides water-soluble compounds that have a dumbbell structure that includes: a) an acetylene moiety on at least a first end of a polymer backbone; and b) at least a second functional group on a second end of the polymer backbone. The second functional group can be another acetylene moiety, or a different reactive group. The second functional group, in some embodiments, is not reactive with acetylene moieties. The invention provides, in some embodiments, water-soluble compounds that comprise at least one arm of a branched molecular structure. For example, the branched molecular structure can be dendritic.

In some embodiments, the acetylene moiety forms a linkage with a reactive moiety on a surface or in a molecule. For example, the reactive moiety can be an acetylene moiety. The acetylene moiety can be linked to said polymer by a linkage that includes a linker moiety. In these embodiments, the polymer can include at least a second functional group other than the acetylene moiety for linking to said linker moiety. For example, the second functional group can be specific for nucleophilic displacement and the linker moiety can include a nucleophilic moiety capable of reacting with said functional group. In other embodiments, the second functional group is amine-specific and said linker moiety includes an active amine moiety. As another example, the second functional group can be specific for reaction at an electrophilic carbonyl and said linker moiety can include an electrophilic carbonyl moiety. For example, the second functional group can be specific for reaction with an activated ester and the linker moiety can include an activated ester. As another example, the second functional group can be specific for reaction with a ketone and said linker moiety includes an ketone. In another embodiment, the second functional group is specific for reaction with a thiol nucleophile and the linker moiety includes a thiol nucleophile. The second functional group is, in some embodiments, specific for reaction with a hydroxyl nucleophile and the linker moiety includes a hydroxyl nucleophile.

DETAILED DESCRIPTION

This invention provides a highly efficient method for the selective modification of proteins with derivatives of water soluble compounds or polymers, including but not limited to PEG derivatives. The derivatives of water soluble compounds or polymers of the present invention may be added to any protein comprising an appropriate functional group. The appropriate functional group may be added to a polypeptide by modifying one or more amino acids of the molecule at a suitable location including but not limited to the amino-terminus, carboxyl-terminus, or within the polypeptide chain. The appropriate functional group may be added to a polypeptide by modifying one or more side chains of one or more naturally occurring amino acids. Alternatively, the appropriate functional groups may be incorporated into a polypeptide using standard chemical polypeptide synthesis with amino acids having the functional group present, or by the selective incorporation of non-genetically encoded amino acids, e.g., those amino acids containing an azide or acetylene moiety, into proteins in response to a selector codon. Once incorporated, the amino acid side chains can then be modified by any suitably reactive water soluble compound or polymer. The suitably reactive compounds or polymers include but are not limited to PEG derivatives. The suitable reactions that may be utilized to attach the water soluble compounds or derivatives to the appropriate functional groups of the polypeptide include but are not limited to, e.g., a Huisgen [3+2] cycloaddition reaction (see, e.g., Padwa, A. in *Comprehensive Organic Synthesis. Vol.*4, (1991) Ed. Trost, B. M., Pergamon, Oxford, p. 1069–1109; and, Huisgen, R. in 1,3-*Dipolar Cycloaddition Chemistry*, (1984) Ed. Padwa, A., Wiley, New York, p. 1–176) with, e.g., acetylene or azide derivatives, respectively.

Because the method involves a cycloaddition rather than a nucleophilic substitution reaction, proteins can be modified with extremely high selectivity. The reaction can be carried out at room temperature in aqueous conditions with excellent regioselectivity (1,4>1,5) by the addition of catalytic amounts of Cu(I) salts to the reaction mixture. See, e.g., Tornoe, et al., (2002) *Org. Chem.* 67:3057–3064; and, Rostovtsev, et al., (2002) *Angew. Chem. Int. Ed.* 41:2596–2599. A molecule that can be added to a protein of the invention through a [3+2] cycloaddition includes virtually any molecule with an azido or acetylene derivative. These molecules may be added to the appropriate functional group on a modified naturally occurring amino acid or an unnatural amino acid with an acetylene group, e.g., p-propargyloxyphenylalanine, or azido group, e.g., p-azido-phenylalanine, respectively.

The resulting five-membered ring that results from the Huisgen [3+2] cycloaddition is not generally reversible in reducing environments and is stable against hydrolysis for extended periods in aqueous environments. Consequently, the physical and chemical characteristics of a wide variety of substances can be modified under demanding aqueous conditions with the active PEG derivatives of the present invention. Even more important, because the azide and acetylene moieties are specific for one another (and do not, for example, react with the side chain functional groups of any of the 20 common, genetically-encoded amino acids), proteins can be modified in one or more specific sites with extremely high selectivity.

The invention also provides water soluble and hydrolytically stable derivatives of compounds and polymers, including but not limited to PEG derivatives and related hydrophilic polymers having one or more acetylene or azide moieties. The PEG polymer derivatives that contain acetylene moieties are highly selective for coupling with azide moieties that have been introduced selectively into proteins in response to a selector codon. Similarly, PEG polymer derivatives that contain azide moieties are highly selective for coupling with acetylene moieties that have been introduced selectively into proteins in response to a selector codon.

More specifically, the azide moieties comprise alkyl azides, aryl azides and derivatives of these azides. The derivatives of the alkyl and aryl azides can include other substituents so long as the acetylene-specific reactivity is maintained. The acetylene moieties comprise alkyl and aryl acetylenes and derivatives of each. The derivatives of the alkyl and aryl acetylenes can include other substituents so long as the azide-specific reactivity is maintained.

The invention includes conjugates of substances having azide or acetylene moieties with water soluble compounds or polymers, such as but not limited to, PEG polymer derivatives having the corresponding acetylene or azide moieties. For example, a PEG polymer containing an azide moiety can be coupled to a biologically active molecule at a position in the protein that contains a non-genetically encoded amino acid bearing an acetylene functionality. The linkage by which the PEG and the biologically active molecule are coupled includes the Huisgen [3+2] cycloaddition product.

It is well established in the art that PEG can be used to modify the surfaces of biomaterials (see, e.g., U.S. Pat. No. 6,610,281). The invention also includes biomaterials comprising a surface having one or more reactive azide or acetylene sites and one or more of the azide- or acetylene-containing polymers of the invention coupled to the surface via the Huisgen [3+2] cycloaddition linkage. Biomaterials and other substances can also be coupled to the azide- or acetylene-activated polymer derivatives through a linkage other than the azide or acetylene linkage, such as through a linkage comprising a carboxylic acid, amine, alcohol or thiol moiety, to leave the azide or acetylene moiety available for subsequent reactions.

The invention includes a method of synthesizing the azide- and acetylene containing compounds or polymers of the invention. In the case of the azide-containing compound or polymer derivative, the azide can be bonded directly to a carbon atom of the polymer. Alternatively, the azide-containing compound or polymer derivative can be prepared by attaching a linking agent that has the azide moiety at one terminus to a conventional activated polymer so that the resulting polymer has the azide moiety at its terminus or any other desired location in the molecule. In the case of the acetylene-containing compound or polymer derivative, the acetylene can be bonded directly to a carbon atom of the polymer. Alternatively, the acetylene-containing compound or polymer derivative can be prepared by attaching a linking agent that has the acetylene moiety at one terminus to a conventional activated polymer so that the resulting polymer has the acetylene moiety within the molecule or at its terminus.

More specifically, in the case of the azide-containing water soluble compound or polymer such as a PEG derivative, a water soluble polymer having at least one active hydroxyl moiety undergoes a reaction to produce a substituted polymer having a more reactive moiety, such as a mesylate, tresylate, tosylate or halogen leaving group, thereon. The preparation and use of PEG or oteher compound or polymer derivatives containing sulfonyl acid halides, halogen atoms and other leaving groups are well known to the skilled artisan. The resulting substituted polymer then undergoes a reaction to substitute for the more reactive moiety an azide moiety at the terminus of the polymer. Alternatively, a water soluble polymer having at least one active nucleophilic or electrophilic moiety undergoes a reaction with a linking agent that has an azide at one terminus so that a covalent bond is formed between the polymer and the linking agent and the azide moiety is positioned at the terminus of the polymer. Nucleophilic and electrophilic moieties, including amines, thiols, hydrazides, hydrazines, alcohols, carboxylates, aldehydes, ketones, thioesters and the like, are well known to the skilled artisan.

More specifically, in the case of the acetylene-containing compound or polymer derivative, a water soluble polymer having at least one active hydroxyl moiety undergoes a reaction to displace a halogen or other activated leaving group from a precursor that contains an acetylene moiety. Alternatively, a water soluble polymer having at least one active nucleophilic or electrophilic moiety undergoes a reaction with a linking agent that has an acetylene at one terminus so that a covalent bond is formed between the polymer and the linking agent and the acetylene moiety is positioned at the terminus of the polymer. The use of halogen moieties, activated leaving group, nucleophilic and electrophilic moieties in the context of organic synthesis and the preparation and use of PEG derivatives is well established to practitioners in the art.

Thus the invention provides a method for the selective modification of proteins with water soluble compounds or polymers, such as PEG, derivatives containing an azide or acetylene moiety. The azide- and acetylene-containing PEG derivatives can be used to modify the properties of surfaces and molecules where biocompatibility, stability, solubility and lack of immunogenicity are important, while at the same time providing a more selective means of attaching the PEG derivatives to proteins than has been known in the art.

Definitions

The terms "functional group", "active moiety", "activating group", "leaving group", "reactive site", "chemically reactive group" and "chemically reactive moiety" are used in the art and herein to refer to distinct, definable portions or units of a molecule. The terms are used herein to indicate the portions of molecules that perform some function or activity and are reactive with other molecules.

The term "linkage" or "linker" is used herein to refer to groups or bonds that normally are formed as the result of a chemical reaction and typically are covalent linkages. Hydrolytically stable linkages means that the linkages are substantially stable in water and do not react with water at useful pHs, e.g., under physiological conditions for an extended period of time, perhaps even indefinitely. Hydrolytically unstable or degradable linkages means that the linkages are degradable in water or in aqueous solutions, including for example, blood. Enzymatically unstable or degradable linkages means that the linkage can be degraded by one or more enzymes. As understood in the art, PEG and related polymers may include degradable linkages in the polymer backbone or in the linker group between the polymer backbone and one or more of the terminal functional groups of the polymer molecule. For example, ester linkages formed by the reaction of PEG carboxylic acids or activated PEG carboxylic acids with alcohol groups on a biologically active agent generally hydrolyze under physiological conditions to release the agent. Other hydrolytically degradable linkages include carbonate linkages; imine linkages resulted from reaction of an amine and an aldehyde; phosphate ester linkages formed by reacting an alcohol with a phosphate group; hydrazone linkages which are reaction product of a hydrazide and an aldehyde; acetal linkages that are the reaction product of an aldehyde and an alcohol; orthoester linkages that are the reaction product of a formate and an alcohol; peptide linkages formed by an amine group, e.g., at an end of a polymer such as PEG, and a carboxyl group of a peptide; and oligonucleotide linkages formed by a phosphoramidite group, e.g., at the end of a polymer, and a 5' hydroxyl group of an oligonucleotide.

The term "biologically active molecule", "biologically active moiety" or "biologically active agent" when used herein means any substance which can affect any physical or biochemical properties of a biological organism, including but not limited to viruses, bacteria, fungi, plants, animals, and humans. In particular, as used herein, biologically active molecules include any substance intended for diagnosis, cure mitigation, treatment, or prevention of disease in humans or other animals, or to otherwise enhance physical or mental well-being of humans or animals. Examples of biologically active molecules include, but are not limited to, peptides, proteins, enzymes, small molecule drugs, dyes, lipids, nucleosides, oligonucleotides, cells, viruses, liposomes, microparticles and micelles. Classes of biologically active agents that are suitable for use with the invention include, but are not limited to, antibiotics, fungicides, antiviral agents, anti-inflammatory agents, anti-tumor agents, cardiovascular agents, anti-anxiety agents, hormones, growth factors, steroidal agents, and the like.

The terms "alkyl," "alkene," and "alkoxy" include straight chain and branched alkyl, alkene, and alkoxy, respectively. The term "lower alkyl" refers to $C_1$–$C_6$ alkyl. The term "alkoxy" refers to oxygen substituted alkyl, for example, of the formulas —OR or —ROR$_1$, wherein R and R$_1$ are each independently selected alkyl. The terms "substituted alkyl" and "substituted alkene" refer to alkyl and alkene, respectively, substituted with one or more non-interfering substituents, such as but not limited to, $C_3$–$C_6$ cycloalkyl, e.g., cyclopropyl, cyclobutyl, and the like; acetylene; cyano; alkoxy, e.g., methoxy, ethoxy, and the like; lower alkanoyloxy, e.g., acetoxy; hydroxy; carboxyl; amino; lower alkylamino, e.g., methylamino; ketone; halo, e.g. chloro or bromo; phenyl; substituted phenyl, and the like. The term "halogen" includes fluorine, chlorine, iodine and bromine.

"Aryl" means one or more aromatic rings, each of 5 or 6 carbon atoms. Multiple aryl rings may be fused, as in naphthyl or unfused, as in biphenyl. Aryl rings may also be fused or unfused with one or more cyclic hydrocarbon, heteroaryl, or heterocyclic rings.

"Substituted aryl" is aryl having one or more non-interfering groups as substituents.

The term "substituents" includes but is not limited to non-interfering substituents. "Non-interfering substituents" are those groups that yield stable compounds. Suitable non-interfering substituents or radicals include, but are not limited to, halo, C.sub.1-C.sub.10 alkyl, $C_2$–$C_{10}$ alkenyl, $C_2$–$C_{10}$ alkynyl, $C_1$–$C_{10}$ alkoxy, $C_1$–$C_{12}$ aralkyl, $C_1$–$C_{12}$ alkaryl, $C_3$–$C_{12}$ cycloalkyl, $C_3$–$C_{12}$ cycloalkenyl, phenyl, substituted phenyl, toluoyl, xylenyl, biphenyl, $C_2$–$C_{12}$ alkoxyalkyl, $C_2$–$C_{12}$ alkoxyaryl, $C_7$–$C_{12}$ aryloxyalkyl, $C_7$–$C_{12}$ oxyaryl, $C_1$–$C_6$ alkylsulfinyl, $C_1$–$C_{10}$ alkylsulfonyl, —(CH$_2$)$_m$—O—(C$_1$–C$_{10}$ alkyl) wherein m is from 1 to 8, aryl, substituted aryl, substituted alkoxy, fluoroalkyl, heterocyclic radical, substituted heterocyclic radical, nitroalkyl, —NO$_2$, —CN, —NRC(O)—(C$_1$–C$_{10}$ alkyl), —C(O)—(C$_1$–C$_{10}$ alkyl), C$_2$–C$_{10}$ alkyl thioalkyl, —C(O)O—(C$_1$–C$_{10}$ alkyl), —OH, —SO$_2$, .dbd.S, —COOH, —NR$_2$, carbonyl, —C(O)—(C$_1$–C$_{10}$ alkyl)-CF3, —C(O)—CF3, —C(O)NR2, —(C$_1$–C$_{10}$ aryl)-S—(C$_6$–C$_{10}$ aryl), —C(O)—(C$_1$–C$_{10}$ aryl), —(CH$_2$)$_m$—O—(—(CH$_2$)$_m$—O—(C$_1$–C$_{10}$ alkyl) wherein each m is from 1 to 8, —C(O)NR.sub.2, —C(S) NR$_2$, —SO$_2$NR$_2$, —NRC(O)NR$_2$, —NRC(S) NR$_2$, salts thereof, and the like. Each R as used herein is H, alkyl or substituted alkyl, aryl or substituted aryl, aralkyl, or alkaryl.

The invention provides azide- and acetylene-containing polymer derivatives comprising a water soluble polymer backbone having an average molecular weight from about 800 Da to about 100,000 Da. The polymer backbone of the water-soluble polymer can be any suitable compound or polymer, including but not limited to nucleic acid molecules, polypeptides, charged compounds or polymers, linear, branched or multi-armed compounds or polymers, and poly (ethylene glycol) (i.e., PEG). However, it should be understood that other compounds and polymers, including but not limited to PEG-related molecules such as poly(dextran) and poly(propylene glycol), are also suitable for use in the practice of this invention and that the use of the term PEG or poly(ethylene glycol) is intended to be inclusive and not exclusive in this respect. The term PEG includes poly (ethylene glycol) in any of its forms, including bifunctional PEG, multiarmed PEG, forked PEG, branched PEG, pendent PEG (i.e. PEG or related polymers having one or more functional groups pendent to the polymer backbone), or PEG with degradable linkages therein.

As used herein, the term "water soluble polymer" refers to any polymer that is soluble in aqueous solvents. Linkage of water soluble polymers to a therapeutic polypeptide can result in changes including, but not limited to, increased or modulated serum half-life, or increased or modulated therapeutic half-life relative to the unmodified form, modulated immunogenicity, modulated physical association characteristics such as aggregation and multimer formation, altered receptor binding and altered receptor dimerization or multimerization. The water soluble polymer may or may not have its own biological activity. Suitable polymers include, but are not limited to, polyethylene glycol, polyethylene glycol propionaldehyde, mono C1–C10 alkoxy or aryloxy derivatives thereof (described in U.S. Pat. No. 5,252,714 which is incorporated by reference herein), monomethoxy-polyethylene glycol, polyvinyl pyrrolidone, polyvinyl alcohol, polyamino acids, divinylether maleic anhydride, N-(2-Hydroxypropyl)-methacrylamide, dextran, dextran derivatives including dextran sulfate, polypropylene glycol, polypropylene oxide/ethylene oxide copolymer, polyoxy-ethylated polyol, heparin, heparin fragments, polysaccharides, oligosaccharides, glycans, cellulose and cellulose derivatives, including but not limited to methylcellulose and carboxymethyl cellulose, starch and starch derivatives, polypeptides, polyalkylene glycol and derivatives thereof, copolymers of polyalkylene glycols and derivatives thereof, polyvinyl ethyl ethers, and alpha-beta-poly[(2-hydroxyethyl)-DL-aspartamide, and the like, or mixtures thereof. Examples of such water soluble polymers include but are not limited to polyethylene glycol and serum albumin.

As used herein, the term "polyalkylene glycol" refers to polyethylene glycol, polypropylene glycol, polybutylene glycol, and derivatives thereof. The term "polyalkylene glycol" encompasses both linear and branched polymers and average molecular weights of between 1 kDa and 100 kDa. Other exemplary embodiments are listed, for example, in commercial supplier catalogs, such as Shearwater Corporation's catalog "Polyethylene Glycol and Derivatives for Biomedical Applications" (2001).

PEG is typically clear, colorless, odorless, soluble in water, stable to heat, inert to many chemical agents, does not hydrolyze or deteriorate, and is generally non-toxic. Poly (ethylene glycol) is considered to be biocompatible, which is to say that PEG is capable of coexistence with living tissues or organisms without causing harm. More specifically, PEG is substantially non-immunogenic, which is to say that PEG does not tend to produce an immune response in the body. When attached to a molecule having some desirable function in the body, such as a biologically active agent, the PEG tends to mask the agent and can reduce or eliminate any immune response so that an organism can tolerate the presence of the agent. PEG conjugates tend not to produce a substantial immune response or cause clotting or other undesirable effects. PEG having the formula —CH$_2$CH$_2$O—(CH$_2$CH$_2$O)$_n$—CH$_2$CH$_2$—, where n is from about 3 to about 4000, typically from about 20 to about 2000, is one useful polymer in the practice of the invention. PEG having a molecular weight of from about 800 Da to about 100,000 Da are particularly useful as the polymer backbone.

The polymer backbone can be linear or branched. Branched polymer backbones are generally known in the art. Typically, a branched polymer has a central branch core moiety and a plurality of linear polymer chains linked to the central branch core. PEG is commonly used in branched forms that can be prepared by addition of ethylene oxide to various polyols, such as glycerol, glycerol oligomers, pentaerythritol and sorbitol. The central branch moiety can also be derived from several amino acids, such as lysine. The branched poly(ethylene glycol) can be represented in general form as R(-PEG-OH)$_m$ in which R is derived from a core moiety, such as glycerol, glycerol oligomers, or pentaerythritol, and m represents the number of arms. Multi-armed PEG molecules, such as those described in U.S. Pat. Nos. 5,932,462 5,643,575; 5,229,490; 4,289,872; U.S. Pat. Appl. 2003/0143596; WO 96/21469; and WO 93/21259, each of which is incorporated by reference herein in its entirety, can also be used as the polymer backbone.

Branched PEG can also be in the form of a forked PEG represented by PEG(—YCHZ$_2$)$_n$, where Y is a linking group and Z is an activated terminal group linked to CH by a chain of atoms of defined length.

Yet another branched form, the pendant PEG, has reactive groups, such as carboxyl, along the PEG backbone rather than at the end of PEG chains.

In addition to these forms of PEG, the polymer can also be prepared with weak or degradable linkages in the backbone. For example, PEG can be prepared with ester linkages in the polymer backbone that are subject to hydrolysis. As shown below, this hydrolysis results in cleavage of the polymer into fragments of lower molecular weight:

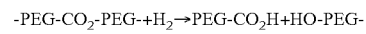
-PEG-CO$_2$-PEG-+H$_2$→PEG-CO$_2$H+HO-PEG-

It is understood by those skilled in the art that the term poly(ethylene glycol) or PEG represents or includes all the above forms.

Many other polymers are also suitable for the invention. Polymer backbones that are water-soluble, with from 2 to about 300 termini, are particularly useful in the invention. Examples of suitable polymers include, but are not limited to, other poly(alkylene glycols), such as poly(propylene glycol) ("PPG"), copolymers thereof (e.g. copolymers of ethylene glycol and propylene glycol), terpolymers thereof, mixtures thereof, and the like. Although the molecular weight of each chain of the polymer backbone can vary, it is typically in the range of from about 800 Da to about 100,000 Da, often from about 6,000 Da to about 80,000 Da.

Those of ordinary skill in the art will recognize that the foregoing list for substantially water soluble backbones is by no means exhaustive and is merely illustrative, and that all polymeric materials having the qualities described above are contemplated.

The polymer derivatives of the invention are "multifunctional", meaning that the polymer backbone has at least two termini, and possibly as many as about 300 termini, functionalized or activated with a functional group. Multifunctional polymer derivatives include linear polymers having two termini, each terminus being bonded to a functional group which may be the same or different.

In one embodiment, the polymer derivative has the structure:

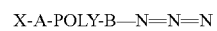
X-A-POLY-B—N═N═N wherein:
N═N═N is an azide moiety;
B is a linking moiety, which may be present or absent;
POLY is a water-soluble non-antigenic polymer;
A is a linking moiety, which may be present or absent and which may be the same as B or different; and
X is a second functional group.

Examples of a linking moiety for A and B include a multiply-functionalized alkyl group containing up to 18, and more preferably between 1–10 carbon atoms. A heteroatom such as nitrogen, oxygen or sulfur may be included with the alkyl chain. The alkyl chain may also be branched at a heteroatom. Other examples of a linking moiety for A and B include a multiply functionalized aryl group, containing up to 10 and more preferably 5–6 carbon atoms. The aryl group may be substituted with one more carbon atoms, nitrogen, oxygen or sulfur atoms. Other examples of suitable linking groups include those linking groups described in U.S. Pat. Nos. 5,932,462 and 5,643,575 and U.S. Pat. Appl. 2003/

0143596, each of which is incorporated by reference herein in its entirety. Those of ordinary skill in the art will recognize that the foregoing list for linking moieties is by no means exhaustive and merely illustrative, and that all linking moieties having the qualities described above are contemplated.

Examples of suitable functional groups for use as X include hydroxyl, protected hydroxyl, alkoxyl, active ester, such as N-hydroxysuccinimidyl esters and 1-benzotriazolyl esters, active carbonate, such as N-hydroxysuccinimidyl carbonates and 1-benzotriazolyl carbonates, acetal, aldehyde, aldehyde hydrates, alkenyl, acrylate, methacrylate, acrylamide, active sulfone, amine, aminooxy, protected amine, hydrazide, protected hydrazide, protected thiol, carboxylic acid, protected carboxylic acid, isocyanate, isothiocyanate, maleimide, vinylsulfone, dithiopyridine, vinylpyridine, iodoacetamide, epoxide, glyoxals, diones, mesylates, tosylates, and tresylate, alkene, ketone, and azide. As would be understood, the selected X moiety should be compatible with the azide group so that reaction with the azide group does not occur. The azide-containing polymer derivatives may be homobifunctional, meaning that the second functional group (i.e., X) is also an azide moiety, or heterobifunctional, meaning that the second functional group is a different functional group.

As would be understood in the art, the term "protected" refers to the presence of a protecting group or moiety that prevents reaction of the chemically reactive functional group under certain reaction conditions. The protecting group will vary depending on the type of chemically reactive group being protected. For example, if the chemically reactive group is an amine or a hydrazide, the protecting group can be selected from the group of tert-butyloxycarbonyl (t-Boc) and 9-fluorenylmethoxycarbonyl (Fmoc). If the chemically reactive group is a thiol, the protecting group can be orthopyridyldisulfide. If the chemically reactive group is a carboxylic acid, such as butanoic or propionic acid, or a hydroxyl group, the protecting group can be benzyl or an alkyl group such as methyl, ethyl, or tert-butyl. Other protecting groups known in the art may also be used in the invention.

Specific examples of terminal functional groups in the literature include N-succinimidyl carbonate (see e.g., U.S. Pat. Nos. 5,281,698, 5,468,478), amine (see, e.g., Buckmann et al. Makromol. Chem. 182:1379 (1981), Zaplipsky et al. Eur. Polym. J. 19:1177 (1983)), hydrazide (See, e.g., Andresz et al. Makromol. Chem. 179:301 (1978)), succinimidyl propionate and succinimidyl butanoate (see, e.g., Olson et al. in Poly(ethylene glycol) Chemistry & Biological Applications, pp 170–181, Harris & Zaplipsky Eds., ACS, Washington, D.C., 1997; see also U.S. Pat. No. 5,672,662), succinimidyl succinate (See, e.g., Abuchowski et al. Cancer Biochem. Biophys. 7:175 (1984) and Joppich et al. Macrolol. Chem. 180:1381 (1979), succinimidyl ester (see, e.g., U.S. Pat. No. 4,670,417), benzotriazole carbonate (see, e.g., U.S. Pat. No. 5,650,234), glycidyl ether (see, e.g., Pitha et al. Eur. J. Biochem. 94:11 (1979), Elling et al., Biotech. Appl. Biochem. 13:354 (1991), oxycarbonylimidazole (see, e.g., Beauchamp, et al., Anal. Biochem. 131:25 (1983), Tondelli et al. J. Controlled Release 1:251 (1985)), p-nitrophenyl carbonate (see, e.g., Veronese, et al., Appl. Biochem. Biotech., 11: 141 (1985); and Sartore et al., Appl. Biochem. Biotech., 27:45 (1991)), aldehyde (see, e.g., Harris et al. J. Polym. Sci. Chem. Ed. 22:341 (1984), U.S. Pat. No. 5,824,784, U.S. Pat. No. 5,252,714), maleimide (see, e.g., Goodson et al. Bio/Technology 8:343 (1990), Romani et al. in Chemistry of Peptides and Proteins 2:29 (1984)), and Kogan, Synthetic Comm. 22:2417 (1992)), orthopyridyl-disulfide (see, e.g., Woghiren, et al. Bioconj. Chem. 4:314 (1993)), acrylol (see, e.g., Sawhney et al., Macromolecules, 26:581 (1993)), vinylsulfone (see, e.g., U.S. Pat. No. 5,900, 461). All of the above references are incorporated herein by reference.

In a preferred embodiment, the polymer derivatives of the invention comprise a polymer backbone having the structure:

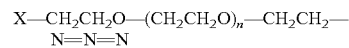

wherein:

X is a functional group as described above; and n is about 20 to about 4000.

In another embodiment, the polymer derivatives of the invention comprise a polymer backbone having the structure:

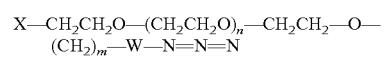

wherein:

W is an aliphatic or aromatic linker moiety comprising between 1–10 carbon atoms;

n is about 20 to about 4000; and

X is a functional group as described above.

The azide-containing PEG derivatives of the invention can be prepared by at least two methods. In one method, shown below, a water soluble polymer backbone having an average molecular weight from about 800 Da to about 100,000 Da, the polymer backbone having a first terminus bonded to a first functional group and a second terminus bonded to a suitable leaving group, is reacted with an azide anion (which may be paired with any of a number of suitable counter-ions, including sodium, potassium, tert-butylammonium and so forth). The leaving group undergoes a nucleophilic displacement and is replaced by the azide moiety, affording the desired azide-containing PEG polymer:

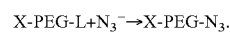

As shown, a suitable polymer backbone for use in the reaction has the formula X-PEG-L, wherein PEG is poly (ethylene glycol) and X is a functional group which does not react with azide groups and L is a suitable leaving group. Examples of suitable functional groups include hydroxyl, protected hydroxyl, acetal, alkenyl, amine, aminooxy, protected amine, protected hydrazide, protected thiol, carboxylic acid, protected carboxylic acid, maleimide, dithiopyridine, and vinylpyridine, and ketone. Examples of suitable leaving groups include chloride, bromide, iodide, mesylate, tresylate, and tosylate.

In a second method for preparation of the azide-containing polymer derivatives of the invention, a linking agent bearing an azide functionality is contacted with a water soluble polymer backbone having an average molecular weight from about 800 Da to about 100,000 Da, wherein the linking agent bears a chemical functionality that will react selectively with a chemical functionality on the PEG polymer, to form an azide-containing polymer derivative product wherein the azide is separated from the polymer backbone by a linking group.

An exemplary reaction scheme is shown below:

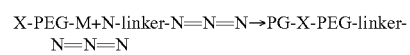

wherein: PEG is poly(ethylene glycol) and X is a capping group such as alkoxy or a functional group as described above; and M is a functional group that is not reactive with the azide functionality but that will react efficiently and selectively with the N functional group.

Examples of suitable functional groups include: M being a carboxylic acid, carbonate or active ester if N is an amine; M being a ketone if N is a hydrazide or aminooxy moiety; M being a leaving group if N is a nucleophile.

Purification of the crude product can usually be accomplished by precipitation of the product followed by chromatography, if necessary.

A more specific example is shown below in the case of PEG diamine, in which one of the amines is protected by a protecting group moiety such as tert-butyl-Boc and the resulting mono-protected PEG diamine is reacted with a linking moiety that bears the azide functionality: BocHN-PEG-NH$_2$+HO$_2$C—(CH$_2$)$_3$—N=N=N.

In this instance, the amine group can be coupled to the carboxylic acid group using a variety of activating agents such as thionyl chloride or carbodiimide reagents and N-hydroxysuccinimide or N-hydroxybenzotriazole to create an amide bond between the monoamine PEG derivative and the azide-bearing linker moiety. After successful formation of the amide bond, the resulting N-tert-butyl-Boc-protected azide-containing derivative can be used directly to modify bioactive molecules or it can be further elaborated to install other useful functional groups. For instance, the N-t-Boc group can be hydrolyzed by treatment with strong acid to generate an omega-amino-PEG-azide. The resulting amine can be used as a synthetic handle to install other useful functionality such as maleimide groups, activated disulfides, activated esters and so forth for the creation of valuable heterobifunctional reagents.

Heterobifunctional derivatives are particularly useful when it is desired to attach different molecules to each terminus of the polymer. For example, the omega. -N-amino-N-azido PEG would allow the attachment of a molecule having an activated electrophilic group, such as an aldehyde, ketone, activated ester, activated carbonate and so forth, to one terminus of the PEG and a molecule having an acetylene group to the other terminus of the PEG.

In another embodiment of the invention, the polymer derivative has the structure:

X-A-POLY-B—C≡C—R wherein:
R can be either H or an alkyl, alkene, alkyoxy, or aryl or substituted aryl group;
B is a linking moiety, which may be present or absent;
POLY is a water-soluble non-antigenic polymer;
A is a linking moiety, which may be present or absent and which may be the same as B or different; and
X is a second functional group.

Examples of a linking moiety for A and B include a multiply-functionalized alkyl group containing up to 18, and more preferably between 1–10 carbon atoms. A heteroatom such as nitrogen, oxygen or sulfur may be included with the alkyl chain. The alkyl chain may also be branched at a heteroatom. Other examples of a linking moiety for A and B include a multiply functionalized aryl group, containing up to 10 and more preferably 5–6 carbon atoms. The aryl group may be substituted with one more carbon atoms, nitrogen, oxygen or sulfur atoms. Other examples of suitable linking groups include those linking groups described in U.S. Pat. Nos. 5,932,462 and 5,643,575 and U.S. Pat. Appl. 2003/ 0143596, each of which is incorporated by reference herein in its entirety. Those of ordinary skill in the art will recognize that the foregoing list for linking moieties is by no means exhaustive and merely illustrative, and that all linking moieties having the qualities described above are contemplated.

Examples of suitable functional groups for use as X include hydroxyl, protected hydroxyl, alkoxyl, active ester, such as N-hydroxysuccinimidyl esters and 1-benzotriazolyl esters, active carbonate, such as N-hydroxysuccinimidyl carbonates and 1-benzotriazolyl carbonates, acetal, aldehyde, aldehyde hydrates, alkenyl, acrylate, methacrylate, acrylamide, active sulfone, amine, aminooxy, protected amine, hydrazide, protected hydrazide, protected thiol, carboxylic acid, protected carboxylic acid, isocyanate, isothiocyanate, maleimide, vinylsulfone, dithiopyridine, vinylpyridine, iodoacetamide, epoxide, glyoxals, diones, mesylates, tosylates, and tresylate, alkene, ketone, and acetylene. As would be understood, the selected X moiety should be compatible with the acetylene group so that reaction with the acetylene group does not occur. The acetylene-containing polymer derivatives may be homobifunctional, meaning that the second functional group (i.e., X) is also an acetylene moiety, or heterobifunctional, meaning that the second functional group is a different functional group.

In another preferred embodiment, the polymer derivatives of the invention comprise a polymer backbone having the structure:

X—CH$_2$CH$_2$O—(CH$_2$CH$_2$O)$_n$—CH$_2$CH$_2$—O—(CH$_2$)$_m$—C≡CH wherein:
X is a functional group as described above;
n is about 20 to about 4000; and
m is between 1 and 10.

Specific examples of each of the heterobifunctional PEG polymers are shown below.

The acetylene-containing PEG derivatives of the invention can be prepared by at least two methods. In a first method, a water soluble polymer backbone having an average molecular weight from about 800 Da to about 100,000 Da, the polymer backbone having a first terminus bonded to a first functional group and a second terminus bonded to a suitable nucleophilic group, is reacted with a compound that bears both an acetylene functionality and a leaving group that is suitable for reaction with the nucleophilic group on the PEG. When the PEG polymer bearing the nucleophilic moiety and the molecule bearing the leaving group are combined, the leaving group undergoes a nucleophilic displacement and is replaced by the nucleophilic moiety, affording the desired acetylene-containing polymer.

X-PEG-Nu+L-A-C→X-PEG-Nu-A-C≡CR'

As shown, a preferred polymer backbone for use in the reaction has the formula X-PEG-Nu, wherein PEG is poly(ethylene glycol), Nu is a nucleophilic moiety and X is a functional group that does not react with Nu, L or the acetylene functionality.

Examples of Nu include amine, alkoxy, aryloxy, sulfhydryl, imino, carboxylate, hydrazide, aminoxy groups that would react primarily via a SN2-type mechanism. Additional examples of Nu groups include those functional groups that would react primarily via an nucleophilic addition reaction. Examples of L groups include chloride, bromide, iodide, mesylate, tresylate, and tosylate and other groups expected to undergo nucleophilic displacement as well as ketones, aldehydes, thioesters, olefins, alpha-beta unsaturated carbonyl groups, carbonates and other electrophilic groups expected to undergo addition by nucleophiles.

In a preferred embodiment, A is an aliphatic linker of between 1–10 carbon atoms or a substituted aryl ring of between 6–14 carbon atoms. X is a functional group which does not react with azide groups and L is a suitable leaving group.

In a second method for preparation of the acetylene-containing polymer derivatives of the invention, a PEG polymer having an average molecular weight from about 800 Da to about 100,000 Da, bearing either a protected functional group or a capping agent at one terminus and a suitable leaving group at the other terminus is contacted by an acetylene anion.

An exemplary reaction scheme is shown below:

wherein:

PEG is poly(ethylene glycol) and X is a capping group such as alkoxy or a functional group as described above; and R' is either H, an alkyl, alkoxy, aryl or aryloxy group or a substituted alkyl, alkoxyl, aryl or aryloxy group.

In the example above, the leaving group L should be sufficiently reactive to undergo SN2-type displacement when contacted with a sufficient concentration of the acetylene anion. The reaction conditions required to accomplish SN2 displacement of leaving groups by acetylene anions are well known in the art.

Purification of the crude product can usually be accomplished by precipitation of the product followed by chromatography, if necessary.

EXAMPLES

The following examples are offered to illustrate, but not to limit the present invention.

Example 1

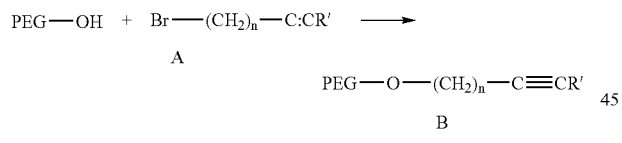

The polyalkylene glycol (P—OH) is reacted with the alkyl halide (A) to form the ether (B). In these compounds, n is an integer from one to nine and R' can be a straight- or branched-chain, saturated or unsaturated C1, to $C_{20}$ alkyl or heteroalkyl group. R' can also be a C3 to C7 saturated or unsaturated cyclic alkyl or cyclic heteroalkyl, a substituted or unsubstituted aryl or heteroaryl group, or a substituted or unsubstituted alkaryl (the alkyl is a C1 to C20 saturated or unsaturated alkyl) or heteroalkaryl group. Typically, P—OH is polyethylene glycol (PEG) or monomethoxy polyethylene glycol (mPEG) having a molecular weight of 800 to 40,000 Daltons (Da).

Example 2

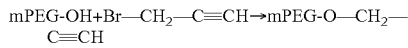

mPEG-OH with a molecular weight of 20,000 Da (mPEG-OH 20 kDa; 2.0 g, 0.1 mmol, Sunbio) was treated with NaH (12 mg, 0.5 mmol) in THF (35 mL). A solution of propargyl bromide, dissolved as an 80% weight solution in xylene (0.56 mL, 5 mmol, 50 equiv., Aldrich), and a catalytic amount of KI were then added to the solution and the resulting mixture was heated to reflux for 2 h. Water (1 mL) was then added and the solvent was removed under vacuum. To the residue was added $CH_2Cl_2$ (25 mL) and the organic layer was separated, dried over anhydrous $Na_2SO_4$, and the volume was reduced to approximately 2 mL. This $CH_2Cl_2$ solution was added to diethyl ether (150 mL) drop-wise. The resulting precipitate was collected, washed with several portions of cold diethyl ether, and dried to afford propargyl-O-PEG.

Example 3

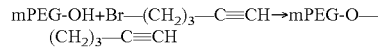

mPEG-OH with a molecular weight of 20,000 Da (mPEG-OH 20 kDa; 2.0 g, 0.1 mmol, Sunbio) was treated with NaH (12 mg, 0.5 mmol) in THF (35 mL). Fifty equivalents of 5-chloro-1-pentyne (0.53 mL, 5 mmol, Aldrich) and a catalytic amount of KI were then added to the mixture. The resulting mixture was heated to reflux for 16 h. Water (1 mL) was then added and the solvent was removed under vacuum. To the residue was added $CH_2Cl_2$ (25 mL) and the organic layer was separated, dried over anhydrous $Na_2SO_4$, and the volume was reduced to approximately 2 mL. This $CH_2Cl_2$ solution was added to diethyl ether (150 mL) drop-wise. The resulting precipitate was collected, washed with several portions of cold diethyl ether, and dried to afford the corresponding alkyne.

Example 4

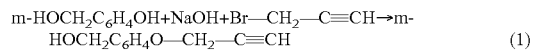  (1)

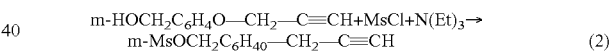  (2)

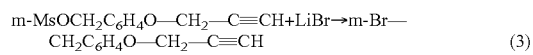  (3)

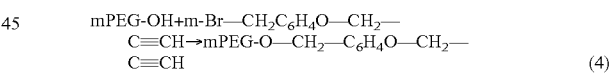  (4)

To a solution of 3-hydroxybenzylalcohol (2.4 g, 20 mmol) in THF (50 mL) and water (2.5 mL) was first added powdered sodium hydroxide (1.5 g, 37.5 mmol) and then a solution of propargyl bromide, dissolved as an 80% weight solution in xylene (3.36 mL, 30 mmol). The reaction mixture was heated at reflux for 6 h. To the mixture was added 10% citric acid (2.5 mL) and the solvent was removed under vacuum. The residue was extracted with ethyl acetate (3×15 mL) and the combined organic layers were washed with saturated NaCl solution (10 mL), dried over MgSO4 and concentrated to give the 3-propargyloxybenzyl alcohol.

Methanesulfonyl chloride (2.5 g, 15.7 mmol) and triethylamine (2.8 mL, 20 mmol) were added to a solution of compound 3 (2.0 g, 11.0 mmol) in $CH_2Cl_2$ at 0° C. and the reaction was placed in the refrigerator for 16 h. A usual work-up afforded the mesylate as a pale yellow oil. This oil (2.4 g, 9.2 mmol) was dissolved in THF (20 mL) and LiBr (2.0 g, 23.0 mmol) was added. The reaction mixture was heated to reflux for 1 h and was then cooled to room temperature. To the mixture was added water (2.5 mL) and the solvent was removed under vacuum. The residue was extracted with ethyl acetate (3×15 mL) and the combined organic layers were washed with saturated NaCl solution (10 mL), dried over anhydrous $Na_2SO_4$, and concentrated to give the desired bromide.

mPEG-OH 20 kDa (1.0 g, 0.05 mmol, Sunbio) was dissolved in THF (20 mL) and the solution was cooled in an ice bath. NaH (6 mg, 0.25 mmol) was added with vigorous stirring over a period of several minutes followed by addition of the bromide obtained from above (2.55 g, 11.4 mmol) and a catalytic amount of KI. The cooling bath was removed and the resulting mixture was heated to reflux for 12 h. Water (1.0) was added to the mixture and the solvent was removed under vacuum. To the residue was added $CH_2Cl_2$ (25 mL) and the organic layer was separated, dried over anhydrous $Na_2SO_4$, and the volume was reduced to approximately 2 mL. Dropwise addition to an ether solution (150 mL) resulted in a white precipitate, which was collected to yield the PEG derivative.

Example 5

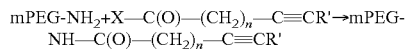

mPEG-NH$_2$+X—C(O)—(CH$_2$)$_n$—C≡CR'→mPEG-NH—C(O)—(CH$_2$)$_n$—C≡CR'

The terminal alkyne-containing poly(ethylene glycol) polymers can also be obtained by coupling a poly(ethylene glycol) polymer containing a terminal functional group to a reactive molecule containing the alkyne functionality as shown above.

Example 6

HO$_2$C—(CH$_2$)$_2$—C≡CH+NHS+DCC→NHSO—C(O)—(CH$_2$)$_2$—C→C≡CH  (1)

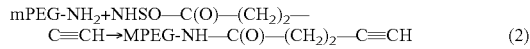

mPEG-NH$_2$+NHSO—C(O)—(CH$_2$)$_2$—C≡CH→MPEG-NH—C(O)—(CH$_2$)$_2$—C≡CH  (2)

4-pentynoic acid (2.943 g, 3.0 mmol) was dissolved in $CH_2Cl_2$ (25 mL). N-hydroxysuccinimide (3.80 g, 3.3 mmol) and DCC (4.66 g, 3.0 mmol) were added and the solution was stirred overnight at room temperature. The resulting crude NHS ester 7 was used in the following reaction without further purification.

mPEG-NH$_2$ with a molecular weight of 5,000 Da (mPEG-NH$_2$, 1 g, Sunbio) was dissolved in THF (50 mL) and the mixture was cooled to 4° C. NHS ester 7 (400 mg, 0.4 mmol) was added portion-wise with vigorous stirring. The mixture was allowed to stir for 3 h while warming to room temperature. Water (2 mL) was then added and the solvent was removed under vacuum. To the residue was added $CH_2Cl_2$ (50 mL) and the organic layer was separated, dried over anhydrous $Na_2SO_4$, and the volume was reduced to approximately 2 mL. This $CH_2Cl_2$ solution was added to ether (150 mL) drop-wise. The resulting precipitate was collected and dried in vacuo.

Example 7

This Example represents the preparation of the methane sulfonyl ester of poly(ethylene glycol), which can also be referred to as the methanesulfonate or mesylate of poly (ethylene glycol). The corresponding tosylate and the halides can be prepared by similar procedures.

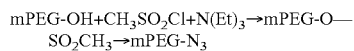

mPEG-OH+CH$_3$SO$_2$Cl+N(Et)$_3$→mPEG-O—SO$_2$CH$_3$→mPEG-N$_3$ mPEG-OH+(MW=3,400, 25 g, 10 mmol) in 150 mL of toluene was azeotropically distilled for 2 hours under nitrogen and the solution was cooled to room temperature. To the solution was added 40 mL of dry $CH_2Cl_2$ and 2.1 mL of dry triethylamine (15 mmol). The solution was cooled in an ice bath and 1.2 mL of distilled methanesulfonyl chloride (15 mmol) was added dropwise. The solution was stirred at room temperature under nitrogen overnight and the reaction was quenched by adding 2 mL of absolute ethanol. The mixture was evaporated under vacuum to remove solvents, primarily those other than toluene, filtered, concentrated again under vacuum, and then precipitated into 100 mL of diethyl ether. The filtrate was washed with several portions of cold diethyl ether and dried in vacuo to afford the mesylate.

The mesylate (20 g, 8 mmol) was dissolved in 75 ml of THF and the solution was cooled to 4° C. To the cooled solution was added sodium azide (1.56 g, 24 mmol). The reaction was heated to reflux under nitrogen for 2 h. The solvents were then evaporated and the residue diluted with $CH_2Cl_2$ (50 mL). The organic fraction was washed with NaCl solution and dried over anhydrous $MgSO_4$. The volume was reduced to 20 ml and the product was precipitated by addition to 150 ml of cold dry ether.

Example 8

N$_3$—C$_6$H$_4$—CO$_2$H→N$_3$—C$_6$H$_4$CH$_2$OH  (1)

N$_3$—C$_6$H$_4$CH$_2$OH→Br—CH$_2$—C$_6$H$_4$—N$_3$  (2)

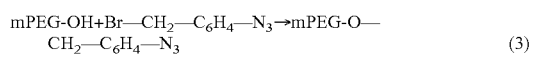

mPEG-OH+Br—CH$_2$—C$_6$H$_4$—N$_3$→mPEG-O—CH$_2$—C$_6$H$_4$—N$_3$  (3)

4-azidobenzyl alcohol can be produced using the method described in U.S. Pat. No. 5,998,595. Methanesulfonyl chloride (2.5 g, 15.7 mmol) and triethylamine (2.8 mL, 20 mmol) were added to a solution of 4-azidobenzyl alcohol (1.75 g, 11.0 mmol) in $CH_2Cl_2$ at 0° C. and the reaction was placed in the refrigerator for 16 h. A usual work-up afforded the mesylate as a pale yellow oil. This oil (9.2 mmol) was dissolved in THF (20 mL) and LiBr (2.0 g, 23.0 mmol) was added. The reaction mixture was heated to reflux for 1 h and was then cooled to room temperature. To the mixture was added water (2.5 mL) and the solvent was removed under vacuum. The residue was extracted with ethyl acetate (3×15 mL) and the combined organic layers were washed with saturated NaCl solution (10 mL), dried over anhydrous $Na_2SO_4$, and concentrated to give the desired bromide.

mPEG-OH 20 kDa (2.0 g, 0.1 mmol, Sunbio) was treated with NaH (12 mg, 0.5 mmol) in THF (35 mL) and the bromide (3.32 g, 15 mmol) was added to the mixture along with a catalytic amount of KI. The resulting mixture was heated to reflux for 12 h. Water (1.0) was added to the mixture and the solvent was removed under vacuum. To the residue was added $CH_2Cl_2$ (25 mL) and the organic layer was separated, dried over anhydrous $Na_2SO_4$, and the volume was reduced to approximately 2 mL. Dropwise addition to an ether solution (150 mL) resulted in a precipitate, which was collected to yield mPEG-O—CH$_2$—C$_6$H$_4$—N$_3$.

Example 9

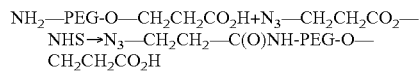

NH$_2$—PEG-O—CH$_2$CH$_2$CO$_2$H+N$_3$—CH$_2$CH$_2$CO$_2$—NHS→N$_3$—CH$_2$CH$_2$—C(O)NH-PEG-O—CH$_2$CH$_2$CO$_2$H

NH$_2$-PEG-O—CH$_2$CH$_2$CO$_2$H (MW 3,400 Da, 2.0 g) was dissolved in a saturated aqueous solution of NaHCO$_3$ (10 mL) and the solution was cooled to 0° C. 3-azido-1-N-hydroxysuccinimdo propionate (5 equiv.) was added with vigorous stirring. After 3 hours, 20 mL of H$_2$O was added and the mixture was stirred for an additional 45 minutes at room temperature. The pH was adjusted to 3 with 0.5 N H$_2$SO$_4$ and NaCl was added to a concentration of approximately 15 wt %. The reaction mixture was extracted with CH$_2$Cl$_2$ (100 mL×3), dried over Na$_2$SO$_4$ and concentrated. After precipitation with cold diethyl ether, the product was collected by filtration and dried under vacuum to yield the omega-carboxy-azide PEG derivative.

Example 10

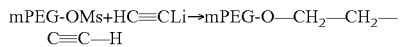

mPEG-OMs+HC≡CLi→mPEG-O—CH$_2$—CH$_2$—C≡C—H

To a solution of lithium acetylide (4 equiv.), prepared as known in the art and cooled to −78 C in THF, is added dropwise a solution of mPEG-OMs dissolved in THF with vigorous stirring. After 3 hours, the reaction is permitted to warm to room temperature and quenched with the addition of 1 mL of butanol. 20 mL of H$_2$O is then added and the mixture was stirred for an additional 45 minutes at room temperature. The pH was adjusted to 3 with 0.5 N H$_2$SO$_4$ and NaCl was added to a concentration of approximately 15 wt %. The reaction mixture was extracted with CH$_2$Cl$_2$ (100 mL×3), dried over Na$_2$SO$_4$ and concentrated. After precipitation with cold diethyl ether, the product was collected by filtration and dried under vacuum to yield the omega-carboxy-azide PEG derivative.

Example 11

The azide- and acetylene-containing amino acids were incorporated site-selectively into proteins using the methods described in L. Wang, et al., (2001), *Science* 292:498–500, J. W. Chin et al., *Science* 301:964–7 (2003)), J. W. Chin et al., (2002), *Journal of the American Chemical Society* 124:9026–9027; J. W. Chin, & P. G. Schultz, (2002), *Chem Bio Chem* 11:1135–1137; J. W. Chin, et al., (2002), *PNAS United States of America* 99:11020–11024: and, L. Wang, & P. G. Schultz, (2002), *Chem. Comm.*, 1–10. Once the amino acids were incorporated, the cycloaddition react was carried out with 0.01 mM protein in phosphate buffer (PB), pH 8, in the presence of 2 mM PEG derivative, 1 mM CUSO$_4$, and ~1 mg Cu-wire for 4 hours at 37° C.

Many modifications and other embodiments of the invention will come to mind to one skilled in the art to which this invention pertains having the benefit of teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. All publications, patents, and patent applications cited herein are hereby incorporated by reference for all purposes.

Additional and Alternate Embodiments of the Invention

In some embodiments, the invention provides a water-soluble compound comprising a polymer and at least one terminal azide moiety, wherein said polymer is selected from the group consisting of poly(alkylene oxides), poly(oxyethylated polyols), and poly(olefinic alcohols). In one embodiment, said polymer is selected from the group consisting of poly(ethylene glycol), poly(propylene glycol), poly(oxyethylated glycerol), poly(oxyethylated sorbitol), poly(oxyethylated glucose), and poly(vinyl alcohol). In one embodiment, said polymer comprises poly(ethylene glycol). In one embodiment, said compound comprises poly(ethylene glycol)azide, and the azide moiety is covalently attached directly to a polymer backbone. In one embodiment, said compound comprises poly(ethylene glycol)azide and the azide moiety is covalently attached to a polymer backbone via a linker.

In some embodiments, said polymer comprises a straight chain polymer and the compound is not substituted beyond the azide moiety. In some embodiments, said polymer is a random or block copolymer or terpolymer. In some embodiments, said compound comprises a dumbbell structure comprising: a) said azide moiety on at least a first end of a polymer backbone; and b) at least a second functional group on a second end of the polymer backbone; wherein the second functional group can be the same or different from said azide moiety. In some embodiments, said second functional group is not reactive with azide moieties.

In some embodiments, said compound comprises at least one arm of a branched molecular structure. In one embodiment, said branched molecular structure is dendritic.

In some embodiments, said azide moiety forms a linkage with a reactive moiety on a surface or in a molecule. In one embodiment, said reactive moiety is an acetylene moiety.

In some embodiments, said azide moiety is linked to said polymer by a linkage that comprises a linker moiety and wherein said polymer comprises at least a second functional group other than said azide moiety for linking to said linker moiety. In one embodiment, said second functional group is specific for nucleophilic displacement and said linker moiety includes a nucleophilic moiety capable of reacting with said functional group. In another embodiment, said second functional group is amine-specific and said linker moiety includes an active amine moiety. In another embodiment, said second functional group is specific for reaction at an electrophilic carbonyl and said linker moiety includes an electrophilic carbonyl moiety. In one embodiment, said second functional group is specific for reaction with an activated ester and said linker moiety includes an activated ester. In one embodiment, said second functional group is specific for reaction with a ketone and said linker moiety includes a ketone. In one embodiment, said second functional group is specific for reaction with a thiol nucleophile and said linker moiety includes a thiol nucleophile. In one embodiment, said second functional group is specific for reaction with a hydroxyl nucleophile and said linker moiety includes a hydroxyl nucleophile. In one embodiment, the linker moiety is selected from the group consisting of: —NH—CO—CH$_2$—CH$_2$—; —CO—NH—CH$_2$—CH$_2$—; —S—CH$_2$—CH$_2$—; and —O—CH$_2$—CH$_2$—.

In some embodiments. the water-soluble compound is stable in aqueous environments at a pH of about 11 or less.

In some embodiments, the invention provides a water soluble activated polymer that is stable against hydrolysis, said activated polymer having the formula: R—CH$_x$CH$_2$—(OCH$_2$CH$_2$)$_n$—N$_3$; wherein n is from about 5 to 3,000, and R is a capping group, a functional group, or a leaving group that can be the same or different from the azide. In one embodiment, R is a functional group selected from the group consisting of hydroxyl, protected hydroxyl, alkoxyl, N-hydroxysuccinimidyl ester, 1-benzotriazolyl ester, N-hydroxysuccinimidyl carbonate, 1-benzotriazolyl carbonate, acetal, aldehyde, aldehyde hydrates, alkenyl, acrylate, methacrylate, acrylamide, active sulfone, amine, aminooxy, protected amine, hydrazide, protected hydrazide, protected thiol, carboxylic acid, protected carboxylic acid, isocyanate, isothiocyanate, maleimide, vinylsulfone, dithiopyridine, vinylpyridine, iodoacetamide, epoxide, glyoxals, diones, mesylates, tosylates, and tresylate, alkene, and ketone. In one embodiment, n is from about 5 to 2,200. In one embodiment, n is from about 34 to 1,100. In one embodiment, n is from about 45 to 110. In one embodiment, R is methoxy ($CH_3O$—). In one embodiment, R is carboxylic acid ($HO_2C$—). In one embodiment, R is amine ($H_2N$—). In one embodiment, R is maleimide. In one embodiment, R is reactive with amines. In one embodiment, R is reactive with an electrophilic carbonyl group. In one embodiment, R is reactive with thiols. In one embodiment, R is reactive with hydroxyls.

In some embodiments, the invention provides a water-soluble compound comprising a polymer and at least one acetylene moiety, wherein said polymer is selected from the group consisting of poly(alkylene oxides), poly(oxyethylated polyols), and poly(olefinic alcohols). In one embodiment, said acetylene moiety is a terminal acetylene group. In some embodiments, said polymer is selected from the group consisting of poly(ethylene glycol), poly(propylene glycol), poly(oxyethylated glycerol), poly(oxyethylated sorbitol), poly(oxyethylated glucose), and poly(vinyl alcohol). In one embodiment, said polymer is poly(ethylene glycol). In one embodiment, said compound is poly(ethylene glycol)acetylene and said acetylene moiety is covalently attached directly to a polymer backbone. In one embodiment, said polymer is poly(ethylene glycol)acetylene and wherein the acetylene moiety is covalently linked to a polymer backbone via a linker moiety. In one embodiment, said polymer is poly(ethylene glycol)acetylene, wherein said acetylene moiety is covalently bound to a polymer backbone via an ether linkage.

In one embodiment, said polymer is a straight chain polymer that is not substituted beyond the acetylene moiety. In one embodiment, said polymer is a random or block copolymer or terpolymer. In one embodiment, said compound comprises a dumbbell structure comprising: a) said acetylene moiety on at least a first end of a polymer backbone; and b) at least a second functional group on at least a second end of the polymer backbone; wherein the second functional group can be the same or different from said acetylene moiety. In some embodiments, said second functional group is not reactive with acetylene moieties.

In one embodiment, said polymer comprises at least one arm of a branched molecular structure. In one embodiment, said branched molecular structure is dendritic.

In one embodiment, said acetylene moiety forms a linkage with a reactive moiety on a surface or in a molecule. In one embodiment, said reactive moiety is an acetylene moiety.

In one embodiment, said acetylene moiety is linked to said polymer by a linkage that comprises a linker moiety and wherein said polymer comprises at least a second functional group other than said acetylene moiety for linking to said linker moiety. In one embodiment, said second functional group is specific for nucleophilic displacement and said linker moiety comprises a nucleophilic moiety capable of reacting with such active moiety. In one embodiment, said second functional group is amine-specific and said linker moiety includes an active amino moiety. In one embodiment, said second functional group is specific for reaction at an electrophilic carbonyl and said linker moiety includes an electrophilic carbonyl moiety. In one embodiment, said second functional group is specific for reaction with an activated ester and said linker moiety includes an activated ester. In another embodiment, said second functional group is specific for reaction with an ketone and said linker moiety includes an ketone. In another embodiment, said second functional group is specific for reaction with a thiol nucleophile and said linker moiety includes a thiol nucleophile. In another embodiment, said second functional group is specific for reaction with a hydroxyl nucleophile and said linker moiety includes a hydroxyl nucleophile. In some embodiments, said linker moiety is selected from the group consisting of: —NH—CO—$CH_2$—$CH_2$—; and —CO—NH—$CH_2$—$CH_2$—.

In some embodiments, the activated polymer is stable in acieous environments at a pH of about 11 or less.

In some embodiments, the invention provides a water soluble activated polymer that is stable against hydrolysis, said activated polymer having the formula: R—$CH_2CH_2$—($OCH_2CH_2$)$_n$—C≡CH wherein n is from about 5 to 3,000, and R is a capping group, a functional group, or a leaving group that can be the same or different from the azide. In some embodiments, R is selected from the group consisting of hydroxyl, protected hydroxyl, alkoxyl, N-hydroxysuccinimidyl ester, 1-benzotriazolyl ester, N-hydroxysuccinimidyl carbonate, 1-benzotriazolyl carbonate, acetal, aldehyde, aldehyde hydrates, alkenyl, acrylate, methacrylate, acrylamide, active sulfone, amine, aminooxy, protected amine, hydrazide, protected hydrazide, protected thiol, carboxylic acid, protected carboxylic acid, isocyanate, isothiocyanate, maleimide, vinylsulfone, dithiopyridine, vinylpyridine, iodoacetamide, epoxide, glyoxals, diones, mesylates, tosylates, and tresylate, alkene, and ketone. In one embodiment, n is from about 5 to 2,200. In one embodiment, n is from about 34 to 1,100. In one embodiment, n is from about 45 to 110. In one embodiment, R is methoxy ($CH_3O$—). In one embodiment, R is carboxylic acid ($HO_2C$—). In one embodiment, R is amine ($H_2N$—). In one embodiment, R is maleimide. In one embodiment, R is reactive with amines. In one embodiment, R is reactive with electrophilic carbonyl groups. In one embodiment, R is reactive with thiols. In one embodiment, R is reactive with hydroxyls.

What is claimed is:

1. A water-soluble compound comprising a polymer containing at least one terminal azide moiety and at least one terminal non-azide moiety selected from the group consisting of hydroxyl, protected hydroxyl, alkoxyl, active ester, active carbonate, acetal, aldehyde, aldehyde hydrates, alkenyl, acrylate, methacrylate, acrylamide, active sulfone, amine, aminooxy, protected amine, hydrazide, protected hydrazide, protected thiol, protected carboxylic acid, isocyanate, isothiocyanate, maleimide, vinylsulfone, dithiopyridine, vinylpyridine, iodoacetamide, epoxide, glyoxals, diones, mesylates, tosylates, tresylate, alkene, and ketone, wherein said polymer is selected from the group consisting of poly(alkylene oxides) and poly(oxyethylated polyols), wherein said compound has a molecular weight selected from the group consisting of between about 6000 and about 80,000, between about 6,000 and 20,000, between about 80,000 and about 100,000, about 6,000, about 20,000, about 80,000, and about 100,000.

2. The water-soluble compound of claim 1, wherein said polymer is selected from the group consisting of poly(ethylene glycol), poly(propylene glycol), poly(oxyethylated glycerol), poly(oxyethylated sorbitol), and poly(oxyethylated glucose).

3. The water-soluble compound of claim 1, wherein said polymer comprises poly(ethylene glycol).

4. The water-soluble compound of claim 3, wherein said compound comprises poly(ethylene glycol)azide and the azide moiety is covalently attached directly to a polymer backbone.

5. The water-soluble compound of claim 1, wherein said polymer comprises a straight chain polymer and the compound is not substituted beyond the azide moiety.

6. The water-soluble compound of claim 1, wherein said polymer is a random or block copolymer or terpolymer.

7. The water-soluble compound of claim 1, wherein said compound comprises a dumbbell structure comprising: a) said azide moiety on at least a first end of a polymer backbone; and b) at least a second functional group on a second end of the polymer backbone; wherein the second functional group is different from said azide moiety.

8. The water-soluble compound of claim 7, wherein said second functional group is not reactive with azide moieties.

9. The water-soluble compound of claim 1, wherein said compound comprises at least one arm of a branched molecular structure.

10. The water-soluble compound of claim 9, wherein said branched molecular structure is dendritic.

11. The water-soluble compound of claim 1, wherein said azide moiety is linked to said polymer by a linkage that comprises a linker moiety and wherein said polymer comprises at least a second functional group other than said azide moiety for linking to said linker moiety.

12. The water-soluble compound of claim 11, wherein said second functional group is specific for nucleophilic displacement and said linker moiety includes a nucleophilic moiety capable of reacting with said functional group.

13. The water-soluble compound of claim 11, wherein said second functional group is amine-specific and said linker moiety includes an active amine moiety.

14. The water-soluble compound of claim 11, wherein said second functional group is specific for reaction at an electrophilic carbonyl and said linker moiety includes an electrophilic carbonyl moiety.

15. The water-soluble compound of claim 11, wherein said second functional group is specific for reaction with an activated ester and said linker moiety includes an activated ester.

16. The water-soluble compound of claim 11, wherein said second functional group is specific for reaction with a ketone and said linker moiety includes an ketone.

17. The water-soluble compound of claim 11, wherein said second functional group is specific for reaction with a thiol nucleophile and said linker moiety includes a thiol nucleophile.

18. The water-soluble compound of claim 11 wherein said second functional group is specific for reaction with a hydroxyl nucleophile and said linker moiety includes a hydroxyl nucleophile.

19. The water-soluble compound of claim 11 wherein said linker moiety is selected from the group consisting of:

—NH—CO—CH$_2$—CH$_2$—;

—CO—NH—CH$_2$—CH$_2$—;

—S—CH$_2$—CH$_2$—; and

—O—CH$_2$—CH$_2$—.

20. The water-soluble compound of claim 1, wherein said compound is stable in aqueous environments at a pH of about 11 or less.

21. A water soluble activated polymer that is stable against hydrolysis, said activated polymer having the formula:

$$R-CH_2CH_2-(OCH_2\ CH_2)_n-N_3;\text{ wherein}$$

n is from about 5 to 3,000, and R is a capping group, a functional group, or a leaving group that is different from the azide, wherein R is a functional group selected from the group consisting of hydroxyl, protected hydroxyl, alkoxyl, N-hydroxysuccinimidyl ester, 1-benzotriazolyl ester, N-hydroxysuccinimidyl carbonate, 1-benzotriazolyl carbonate, acetal, aldehyde, aldehyde hydrates, alkenyl, acrylate, methacrylate, acrylamide, active sulfone, amine, aminooxy, protected amine, hydrazide, protected hydrazide, protected thiol, carboxylic acid, protected carboxylic acid, isocyanate, isothiocyanate, maleimide, vinylsulfone, dithiopyridine, vinylpyridine, iodoacetamide, epoxide, glyoxals, diones, mesylates, tosylates, tresylate, alkene, and ketone.

22. The water soluble activated polymer of claim 21 wherein n is from about 5 to 2,200.

23. The water soluble activated polymer of claim 21 wherein n is from about 34 to 1,100.

24. The water soluble activated polymer of claim 21 wherein n is from about 45 to 110.

25. The water soluble activated polymer of claim 21 wherein R is carboxylic acid (HO$_2$C—).

26. The water soluble activated polymer of claim 21 wherein R is amine (H$_2$N—).

27. The water soluble activated polymer of claim 21 wherein R is maleimide.

28. The water soluble activated polymer of claim 21 wherein R is reactive with amines.

29. The water soluble activated polymer of claim 21 wherein R is reactive with an electrophilic carbonyl group.

30. The water soluble activated polymer of claim 21 wherein R is reactive with thiols.

31. The water soluble activated polymer of claim 21 wherein R is reactive with hydroxyls.

32. A water soluble compound comprising a polymer containing at least one terminal azide moiety and at least one terminal methoxy moiety, wherein said polymer is selected from the group consisting of poly(alkylene oxides), poly (oxyethylated polyols), and poly(olefinic alcohols), and wherein said polymer has a molecular weight between about 20 kDa and about 100 kDa.

33. The water-soluble compound of claim 32, wherein said polymer is selected from the group consisting of poly(ethylene glycol), poly(propylene glycol), poly(oxyethylated glycerol), poly(oxyethylated sorbitol), poly(oxyethylated glucose), and poly(vinyl alcohol).

34. The water-soluble compound of claim 32, wherein said polymer comprises poly(ethylene glycol).

35. A water soluble compound comprising a polymer and at least one terminal azide moiety and at least one terminal methoxy moiety, wherein said polymer has a molecular weight of about 20 kDa.

36. A water soluble compound comprising a polymer and at least one terminal azide moiety and at least one terminal methoxy moiety, wherein said polymer has a molecular weight of about 100 kDa.

37. A water soluble compound comprising a polymer containing at least one terminal azide moiety and at least one terminal methoxy moiety, wherein said polymer is selected from the group consisting of poly(alkylene oxides), poly (oxyethylated polyols), and poly(olefinic alcohols), and wherein said polymer has a molecular weight between about 6 kDa and about 80 kDa.

38. The water-soluble compound of claim 37, wherein said polymer is selected from the group consisting of poly(ethylene glycol), poly(propylene glycol), poly(oxyethylated glycerol), poly(oxyethylated sorbitol), poly(oxyethylated glucose), and poly(vinyl alcohol).

39. The water-soluble compound of claim 37, wherein said polymer comprises poly(ethylene glycol).

40. A water soluble compound comprising a polymer and at least one terminal azide moiety and at least one terminal methoxy moiety, wherein said polymer has a molecular weight of about 6 kDa.

41. A water soluble compound comprising a polymer containing at least one terminal azide moiety and at least one terminal methoxy moiety, wherein said polymer has a molecular weight of about 80 kDa.

42. A water soluble compound comprising a polymer containing at least one terminal azide moiety and at least one terminal methoxy moiety, wherein said polymer is selected from the group consisting of poly(alkylene oxides), poly(oxyethylated polyols), and poly(olefinic alcohols), and wherein said polymer has a molecular weight between about 6 kDa and about 20 kDa.

43. The water-soluble compound of claim 42, wherein said polymer is selected from the group consisting of poly(ethylene glycol), poly(propylene glycol), poly(oxyethylated glycerol), poly(oxyethylated sorbitol), poly(oxyethylated glucose), and poly(vinyl alcohol).

44. The water-soluble compound of claim 42, wherein said polymer comprises poly(ethylene glycol).

45. A water soluble compound comprising a polymer containing at least one terminal azide moiety and at least one terminal methoxy moiety, wherein said polymer is selected from the group consisting of poly(alkylene oxides), poly(oxyethylated polyols), and poly(olefinic alcohols), and wherein said polymer has a molecular weight between about 80 kDa and about 100 kDa.

46. The water-soluble compound of claim 45, wherein said polymer is selected from the group consisting of poly(ethylene glycol), poly(propylene glycol), poly(oxyethylated glycerol), poly(oxyethylated sorbitol), poly(oxyethylated glucose), and poly(vinyl alcohol).

47. The water-soluble compound of claim 45, wherein said polymer comprises poly(ethylene glycol).

48. The water-soluble compound of claim 1, wherein said at least one terminal non-azide moiety is a N-hydroxysuccinimidyl ester.

49. The water-soluble compound of claim 1, wherein said at least one terminal non-azide moiety is a 1-benzotriazolyl ester.

50. The water-soluble compound of claim 1, wherein said at least one terminal non-azide moiety is a N-hydroxysuccinimidyl carbonate.

51. The water-soluble compound of claim 1, wherein said at least one terminal non-azide moiety is a 1-benzotriazolyl carbonate.

* * * * *